(12) United States Patent
Sharp

(10) Patent No.: US 8,564,147 B1
(45) Date of Patent: Oct. 22, 2013

(54) SYSTEM FOR SOLAR AND WIND ENERGY COLLECTION WITH ADVANCED BLADE DESIGN

(76) Inventor: Johnny L. Sharp, Culver City, CA (US)

( * ) Notice: Subject to any disclaimer, the term of this patent is extended or adjusted under 35 U.S.C. 154(b) by 130 days.

(21) Appl. No.: 13/200,125

(22) Filed: Sep. 19, 2011

Related U.S. Application Data

(60) Provisional application No. 61/384,421, filed on Sep. 20, 2010.

(51) Int. Cl.
    *F03D 9/02* (2006.01)
(52) U.S. Cl.
    USPC ................................................ 290/44; 290/55
(58) Field of Classification Search
    USPC .............................. 290/11, 55, 44; 416/231 R
    See application file for complete search history.

(56) References Cited

U.S. PATENT DOCUMENTS

| | | | | |
|---|---|---|---|---|
| 1,717,745 | A * | 6/1929 | Tismer | 416/228 |
| 1,961,114 | A * | 5/1934 | Tully et al. | 416/91 |
| 6,661,113 | B1 * | 12/2003 | Bonin | 290/55 |
| 2007/0090653 | A1 * | 4/2007 | Martelon | 290/55 |
| 2008/0196758 | A1 * | 8/2008 | McGuire | 136/245 |
| 2010/0101988 | A1 * | 4/2010 | Saeed et al. | 210/171 |
| 2010/0314876 | A1 * | 12/2010 | Frayne | 290/44 |
| 2011/0169275 | A1 * | 7/2011 | Garvey | 290/1 R |
| 2011/0169334 | A1 * | 7/2011 | Williams | 307/72 |

* cited by examiner

*Primary Examiner* — Tho D Ta
(74) *Attorney, Agent, or Firm* — Carlos Candeloro

(57) ABSTRACT

A solar and wind energy collection system includes a solar energy collecting structure and a wind turbine disposed on a common supporting surface. The solar energy collecting structure includes a frame that defines the lateral surfaces of a frustum and one or more photovoltaic cells that collect energy from sun light to generate electricity. The wind turbine includes a tower affixed to the supporting surface and extending therefrom within the lateral surfaces defined by said frame while elevating past said frame through an opening on the apex of the frame. The wind turbine also includes a nacelle mounted on said tower and a rotor coupled to the nacelle. The rotor includes a rotatable hub and at least one blade. In one embodiment, the blade has one or more air conduits that provide a fluid connection between opposite high-pressure and low-pressure faces of the blade.

17 Claims, 2 Drawing Sheets

SYSTEM FOR SOLAR AND WIND ENERGY COLLECTION WITH ADVANCED BLADE DESIGN

This application claims the benefit of U.S. provisional patent application No. 61/384,421 filed on Sep. 20, 2010, which is hereby incorporated and made a part hereof by reference for all purposes as if fully set forth herein.

BACKGROUND OF THE INVENTION

Use of renewable energy has increased significantly in recent years due to environmental and economic concerns coupled with improvements in technology that have greatly increased the efficiency and cost per kilowatt (kW) of these systems.

Wind power has been harnessed for centuries, initially in mills and later for pumping water. More recently, wind turbines have been introduced that generate electricity. Improvements in material science and turbine design have increased the efficiency and decreased the cost per kW. However the approach still has certain drawbacks, including the dependence on variable environmental factors like adequate wind speed and the cost competitiveness with fossil fuels, particularly when environmental costs like pollution are not factored in.

Solar power has made great strides with the development of new photovoltaic materials which are less expensive to produce and are more efficient on a per area basis. Nevertheless, the generation of solar power is not yet cost-competitive (without factoring externalities such as pollution) with fossil fuels. In addition, this approach also relies on variable environmental factors (sunshine) which is not always available, for example at night, thus interrupting energy generation.

Co-locating solar and wind energy collection systems in a single plant should have certain advantages, for example, fewer interruptions in energy generation if sun and wind availability are not correlated at the plant location. In addition, if both solar and wind systems can be working simultaneously at least some of the time, co-location also permits greater energy generation per unit area of land and increased peak production per unit area of land, thus decreasing overall costs of production. Co-location may also reduce costs associated with maintenance due to economies of scale.

Accordingly, there is a need for a system that generates electrical power from renewable sources and that maximizes energy generation while minimizing interruptions due to environmental factors. There is also a need for a system that generates energy from renewable sources at an improved cost per kW.

SUMMARY OF THE INVENTION

The present disclosure is directed generally toward systems and methods for collection of wind and solar energy for the generation of electricity. A system in accordance with one aspect includes a solar energy collecting structure and a wind turbine disposed on a common supporting surface. The solar energy collecting structure includes a frame and one or more photovoltaic cells that collect energy from sun light to generate electricity. The frame generally defines the lateral surfaces of a frustum having a base disposed on the supporting surface and an apex having an opening. The wind turbine has a tower that extends from the supporting surface, within the lateral surfaces defined by the frame, and through said opening on the apex of the frame. The wind turbine also includes a nacelle mounted on said tower with a rotor coupled to the nacelle. The rotor has a rotatable hub and at least one blade coupled to, and extending radially outwardly from, the hub. The nacelle may rotate 360 degrees around its yaw axis without the blades colliding with said solar energy collecting structure. The blade has opposite high-pressure and low-pressure faces spaced apart such as to define an internal volume, opposite leading and trailing edges that connect the high-pressure and low-pressure faces, and at least one air conduit that provides a fluid connection between said opposite high-pressure and low-pressure faces. The air conduit includes an inlet on the high-pressure face of the blade, an outlet on the low pressure face of the blade, and a tubular length extending between the inlet and the outlet and providing a fluid communication between said inlet and said outlet. The inlet is generally distal to said outlet relative said hub. The inlet is also a greater distance from the leading edge than said outlet. The blades coupled to hub force rotor to rotate under certain wind conditions enabling kinetic energy to be transferred from the wind into usable mechanical energy or electrical energy.

In a second embodiment, a solar energy collecting structure and wind turbine are disposed on a common supporting surface. The solar energy collecting structure includes a frame and one or more photovoltaic cells that collect energy from sun light to generate electricity. The frame generally defines the lateral surfaces of a frustum having a base disposed on the supporting surface and an apex having an opening. The wind turbine has a tower that extends from the supporting surface within the lateral surfaces defined by the frame and through said opening on the apex of the frame. The wind turbine also includes a nacelle mounted on said tower with a rotor coupled to the nacelle. The rotor has a rotatable hub and at least one blade coupled to, and extending radially outwardly from, the hub. The nacelle may rotate 360 degrees around its yaw axis without the blades colliding with said solar energy collecting structure. The blades coupled to hub force rotor to rotate under certain wind conditions enabling kinetic energy to be transferred from the wind into usable mechanical energy or electrical energy.

In a third embodiment, a method of collecting wind and solar energy uses a system having a structure in accordance with the present invention.

In a fourth embodiment, a turbine blade includes a root adapted to couple said turbine blade to a rotor, a tip opposite said root, opposite high-pressure and low-pressure faces spanning the distance between said root and said tip, spaced apart such as to define an internal volume, opposite leading and trailing edges that connect the high-pressure and low-pressure faces, and at least one air conduit. The air conduit provides a fluid connection between said opposite high-pressure and low-pressure faces, and generally includes an inlet on the high-pressure face of the blade, an outlet on the low pressure face of the blade, and a tubular length extending between the inlet and the outlet providing a fluid communication between said inlet and said outlet. Air conduit inlet is generally a greater distance from the root than the outlet. Air conduit inlet is also a greater distance from the leading edge than said outlet.

In fifth embodiment, a method of collecting wind energy uses a blade having a structure in accordance with the present invention.

DETAILED DESCRIPTION

Figure 1:
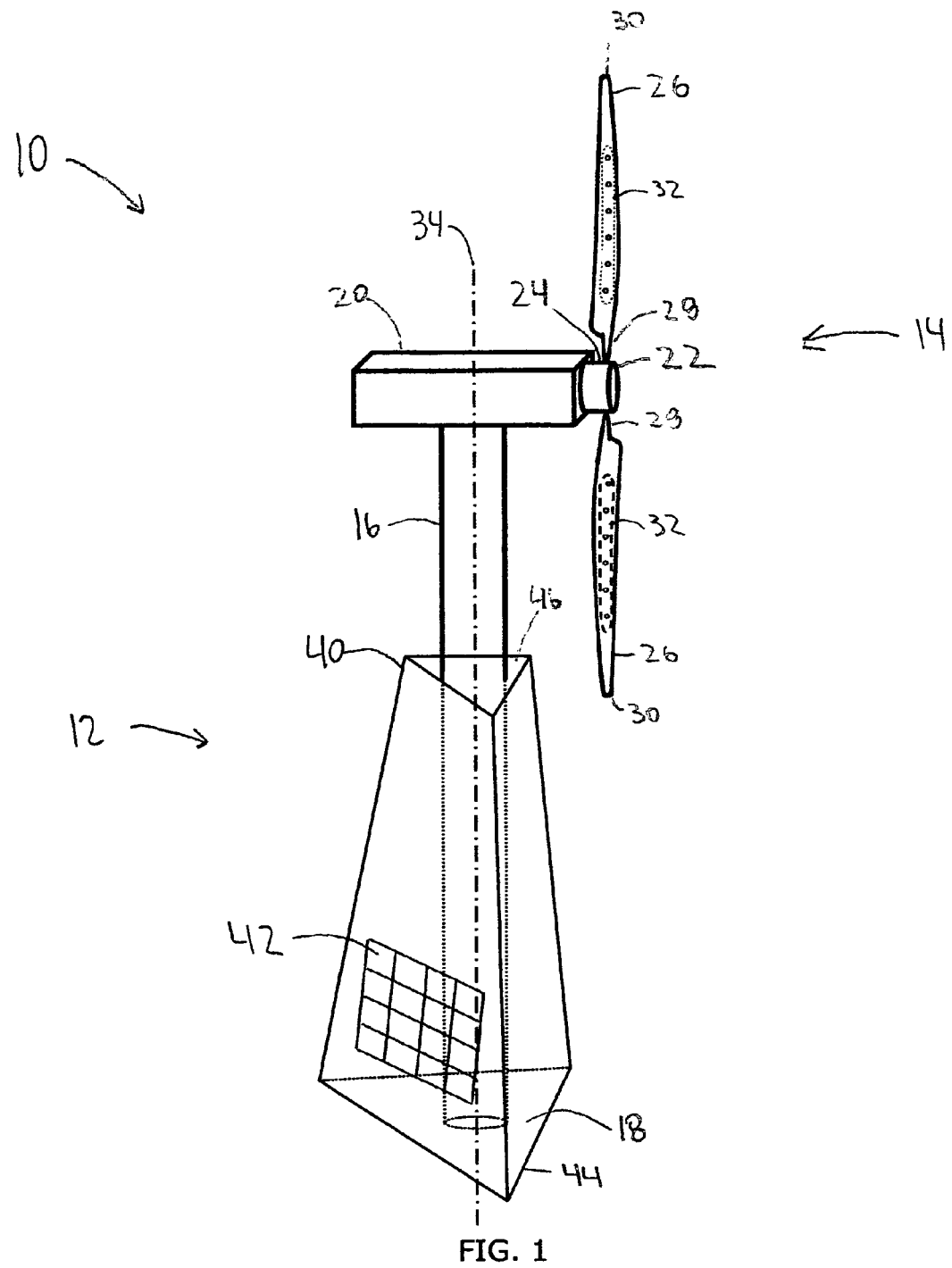
FIG. 1 is a perspective view of a solar and wind energy collection system in accordance with an embodiment of the present invention.

FIG. 1 is a perspective view of a solar and wind energy collection system 10 having one or more solar panels 12 disposed at the base of a wind turbine 14 in accordance with one embodiment of the present invention. Except for the modifications described herein, wind turbine 14 is generally of conventional construction, and includes a tower 16 that extends from a supporting surface 18, a nacelle 20 mounted on tower 16 with a rotor 22 coupled to nacelle 20. The rotor 22 includes a rotatable hub 24 and at least one blade 26 coupled to hub 24 through a blade root portion 28 and extending radially outward from the hub 24 ending in a blade tip 30. In the embodiment shown, rotor 22 has two blades 26. In alternative embodiments, rotor 22 may have more or less than two blades 26. In accordance with one embodiment of the present invention, blades 26 include an advanced air flow system 32 shown and described in greater detail in connection with FIGS. 2-4. Blades 26 coupled to hub 24 force rotor 22 to rotate under certain wind conditions, to enable kinetic energy to be transferred from the wind into usable mechanical energy, and subsequently, electrical energy. The size of the wind turbine 14, including the height of tower 16 and length of blades 26 is selected based upon factors and conditions known in the art. The yaw direction of nacelle 20 about yaw axis 34 and pitch and angle of attack of blades 26 may be controlled to position blades 26 with respect to wind direction to maximize energy generation and/or safe operation of the wind turbine.

As shown in FIG. 1, in accordance with an embodiment of the present invention solar panels 12 are arranged at the base of the wind turbine 14. Solar panels 12 are arranged at the base of the wind turbine 14 in a manner and configuration such as to minimize the footprint of the system 10 and maximize the collection of solar energy while permitting 360 degrees rotation of the nacelle 20 around the yaw axis 34 of nacelle 34 without rotating blades 26 colliding into solar panels 12. Solar panels generally include a frame 40 supporting photovoltaic cells 42, or the like, that collect energy from light and transform it into a different form of energy, e.g., electricity. In accordance with an embodiment of the present invention the solar panels 12 are arranged such as to define the lateral surfaces of a frustum enveloping tower 16, with the frustum's base 44 on the supporting surface 18, while the tower 16 elevates through an opening 46 on the frustum's apex. In one embodiment, shown in FIG. 1, the solar panels 12 define the lateral surface a truncated triangular pyramid frustum. In other embodiments, the solar panels 12 may define the lateral surface of other frustums, including, for example, a truncated concave cone.

Figure 2:
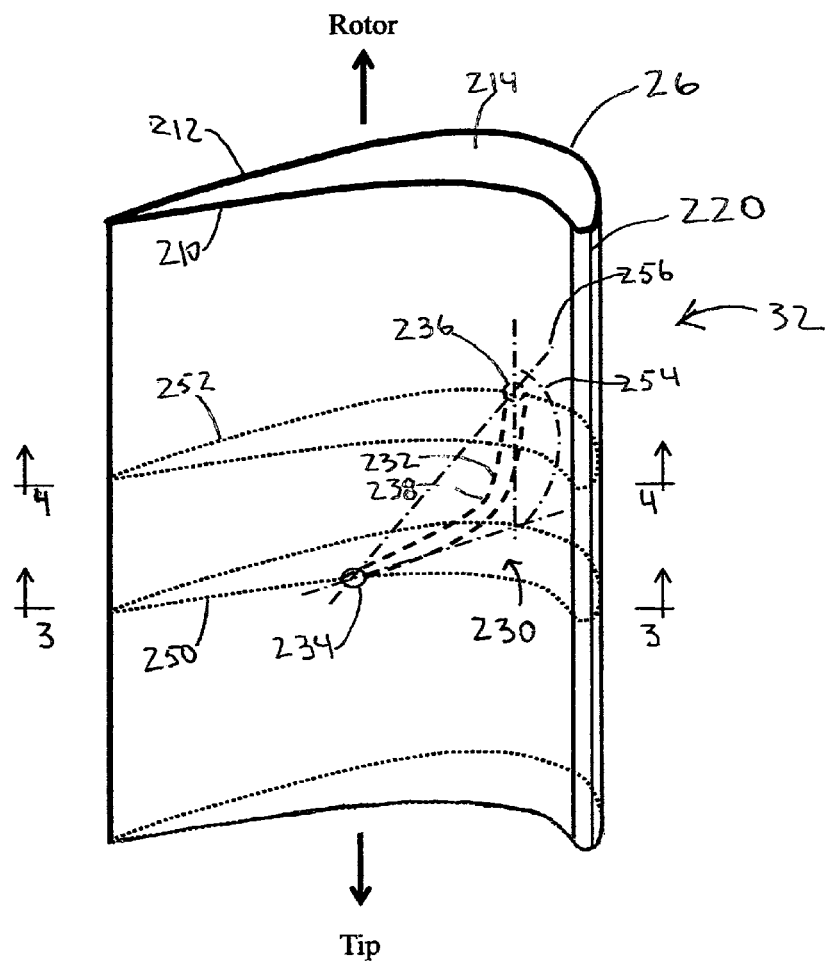
FIG. 2 is a diagrammatic illustration of a section of a wind turbine blade having an air flow system in accordance with an embodiment of the present invention.
Figure 3:
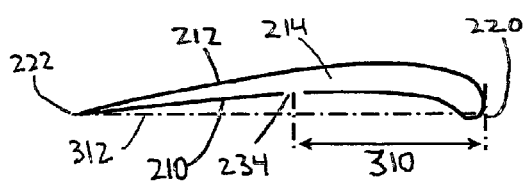
FIG. 3 is a cross-sectional view taken along lines 3-3 of FIG. 2.
Figure 4:
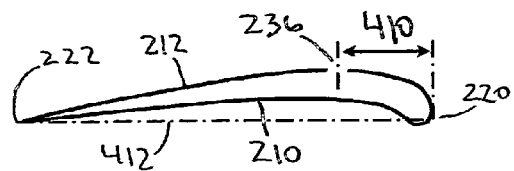
FIG. 4 is a cross-sectional view taken along lines 4-4 of FIG. 2.

FIGS. 2-4 further illustrate air flow system 32 in accordance with an embodiment of the present invention. FIG. 2 is a diagrammatic illustration of a section of blade 26. The portion of the blade 26 between the root 28 (not shown in FIG. 2) and the tip 30 (not shown in FIG. 2) generally includes opposite high-pressure 210 and low-pressure 212 faces which are spaced apart such as to define an internal volume 214, and opposite leading 220 and trailing 222 edges that connect the high-pressure 210 and low-pressure 212 faces. Air flow system 32 includes one or more air conduits 230 creating a fluid connection between said opposite high-pressure 210 and low-pressure 212 faces. Air conduit 230 is formed of one or more internal tube members 232 defining an inlet 234 located on the high-pressure face 210 of the blade 26, an outlet 236 located on the low pressure face 212 of the blade 26, and a length 238 extending between the inlet 234 and the outlet 236. Air flow system 32 includes any effective number air conduits 230 per blade 26, disposed on the blade 26 in any effective manner. For example, a set of air conduits 230 may be arranged in a single row from root to tip. Alternatively, the set of air conduits 230 may be arranged in multiple rows.

Inlet 234 is generally located on a chord plane 250 that is distal (e.g., closer to the tip 30) than chord plane 252 on which outlet 236 is located. As used herein, the term "chord plane" means a Cartesian plane perpendicular to the leading edge along a chord of the blade. In particular, angle 254 between the inlet 234 chord plane 250 and imaginary line 256 connecting inlet 234 to outlet 236 will generally be about 45 degrees. In other embodiments, angle 254 can range between about 10 degrees and about 80 degrees.

As illustrated in FIG. 3, inlet 234 is a distance 310 from the leading edge 220 measured along the chord 312. As illustrated in FIG. 4, outlet 236 is a distance 410 from the leading edge measured along chord 412. In accordance with the present invention, inlet 234 is further from the leading edge 220 than outlet 236 such that distance 310>distance 410. Distance 310 is generally in a range between about ⅕ and ⅘ of chord's 312 length.

Tube member length 238 connecting inlet 234 and outlet 236 is of any effective shape. For example, tube member length 238 may have an approximately straight or curved, parabolic or arcuate shape. When having an approximately curved, parabolic or arcuate shape, the tube member length 238 may cover between the range of about one and about 90 degrees of a circle, with the convexity (elbow) of the tube member length 238 facing the tip 30 end of the blade 26. In one embodiment, tube member length 238 has an approximately arcuate shape covering about 30 degrees of a circle between the inlet 234 and the outlet 236.

In use, when air flow (e.g., wind) impinges on blade 26, due to the pressure gradient between inlet 234 and outlet 236, tube member 232 bypasses an amount of the flow through high-pressure face 210 of blade 26 and turn it in a direction for ejection out from the low pressure face 212 of the blade 26 thus affecting the flow of air around the blade 26 and improving the efficiency of the wind turbine.

In another embodiment, a method of collecting energy uses a blade in accordance with the present invention.

Accordingly, a system that collects wind and solar power and has a small footprint has been described. The system allows for efficient production of energy while minimizing set-up and maintenance costs.

While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:
1. A solar and wind energy collection system, comprising:
a solar energy collecting structure disposed on a supporting surface, wherein the solar energy collecting structure comprises a frame and one or more photovoltaic cells that collect energy from light to generate electricity supported by said frame, wherein said frame defines the lateral surfaces of a frustum having a base and an apex, said base disposed on said supporting surface and said apex having an opening;

a wind turbine extending from the supporting surface, the wind turbine comprising:

a tower having a first and a second end, said first end affixed to supporting surface and extending therefrom within the lateral surfaces defined by said frame, said tower elevating past said frame through said opening on the apex of the frame;

a nacelle mounted on said tower's second end;

a rotor coupled to nacelle, the rotor comprising a rotatable hub and at least one blade coupled to, and extending radially outward from, hub, said blade comprising:

opposite high-pressure and low-pressure faces spaced apart such as to define an internal volume;

opposite leading and trailing edges that connect the high-pressure and low-pressure faces;

an air conduit, wherein the air conduit provides a fluid connection between said opposite high-pressure and low-pressure faces, said air conduit comprising an inlet on the high-pressure face of the blade, an outlet on the low pressure face of the blade, and a tubular length extending between the inlet and the outlet and providing a fluid communication between said inlet and said outlet, wherein said inlet is distal to said outlet relative said hub, and wherein said inlet is a greater distance from said leading edge than said outlet;

such that blades coupled to hub force rotor to rotate under certain wind conditions enabling kinetic energy to be transferred from the wind into usable mechanical energy or electrical energy;

wherein nacelle may rotate 360 degrees around the yaw axis of nacelle without blade colliding with said solar energy collecting structure.

2. The solar and wind energy collection system of claim 1, wherein said lateral surfaces defined by said frame are a truncated triangular pyramid.

3. The solar and wind energy collection system of claim 1, wherein said lateral surfaces defined by said frame are a truncated concave cone.

4. The solar and wind energy collection system of claim 1, wherein the tubular length extending and providing a fluid communication between said inlet and said outlet is curved with an arc spanning about 30 degrees.

5. The solar and wind energy collection system of claim 4, wherein the curved tubular length extending and providing a fluid communication between said inlet and said outlet has a concavity that faces said hub.

6. The solar and wind energy collection system of claim 1, wherein outlet is at an angle of about 45 degrees from inlet relative to inlet chord plane.

7. The solar and wind energy collection system of claim 1, wherein distance of inlet to leading edge ranges from about 0.2 and about 0.8 chord length.

8. The solar and wind energy collection system of claim 7, wherein distance of inlet to leading edge is about 0.5 chord length.

9. A solar and wind energy collection system, comprising:

a solar energy collecting structure disposed on a supporting surface, wherein the solar energy collecting structure comprises a frame and one or more photovoltaic cells that collect energy from light to generate electricity supported by said frame, wherein said frame defines the lateral surfaces of a frustum having a base and an apex, said base disposed on said supporting surface and said apex having an opening;

a wind turbine extending from the supporting surface, the wind turbine comprising:

a tower having a first and a second end, said first end affixed to supporting surface and extending therefrom within the lateral surfaces defined by said frame, said tower elevating past said frame through said opening on the apex of the frame;

a nacelle mounted on said tower's second end;

a rotor coupled to nacelle, the rotor comprising a rotatable hub and at least one blade coupled to, and extending radially outward from, hub, such that blades coupled to hub force rotor to rotate under certain wind conditions enabling kinetic energy to be transferred from the wind into usable mechanical energy or electrical energy;

wherein nacelle may rotate 360 degrees around the yaw axis of nacelle without blade colliding with said solar energy collecting structure.

10. The solar and wind energy collection system of claim 9, wherein said lateral surfaces defined by said frame are a truncated triangular pyramid.

11. The solar and wind energy collection system of claim 9, wherein said lateral surfaces defined by said frame are a truncated concave cone.

12. A turbine blade, comprising:

a root adapted to couple said turbine blade to a rotor;

a tip opposite said root;

opposite high-pressure and low-pressure faces spanning the distance between said root and said tip, wherein said opposite high-pressure and low-pressure faces are spaced apart such as to define an internal volume;

opposite leading and trailing edges that connect the high-pressure and low-pressure faces;

an air conduit, wherein the air conduit provides a fluid connection between said opposite high-pressure and low-pressure faces, said air conduit comprising an inlet on the high-pressure face of the blade, an outlet on the low pressure face of the blade, and a tubular length extending between the inlet and the outlet and providing a fluid communication between said inlet and said outlet;

wherein said inlet is distal to said outlet relative said root, and wherein said inlet is a greater distance from said leading edge than said outlet.

13. The blade of claim 12, wherein the tubular length extending and providing a fluid communication between said inlet and said outlet is curved with an arc spanning about 30 degrees.

14. The blade of claim 13, wherein the curved tubular length extending and providing a fluid communication between said inlet and said outlet has a concavity that faces said root.

15. The blade of claim 12, wherein outlet is at an angle of about 45 degrees from inlet relative to inlet chord plane.

16. The blade of claim 12, wherein distance of inlet to leading edge ranges from about 0.2 and about 0.8 chord length.

17. The blade of claim 12, wherein distance of inlet to leading edge is about 0.5 chord length.

* * * * *